(12) United States Patent
Liu

(10) Patent No.: US 11,865,909 B2
(45) Date of Patent: Jan. 9, 2024

(54) ELECTRIC CAR PROVIDED WITH BATTERY COMPARTMENT

(71) Applicant: QINGDAO UNITED NEW ENERGY AUTOMOBILE CO., LTD., Qingdao (CN)

(72) Inventor: Tongxin Liu, Qingdao (CN)

(73) Assignee: QINGDAO UNITED NEW ENERGY AUTOMOBILE CO., LTD., Qingdao (CN)

( * ) Notice: Subject to any disclaimer, the term of this patent is extended or adjusted under 35 U.S.C. 154(b) by 310 days.

(21) Appl. No.: 17/281,836

(22) PCT Filed: Jul. 29, 2019

(86) PCT No.: PCT/CN2019/098225
§ 371 (c)(1),
(2) Date: Mar. 31, 2021

(87) PCT Pub. No.: WO2020/082843
PCT Pub. Date: Apr. 30, 2020

(65) Prior Publication Data
US 2022/0009329 A1   Jan. 13, 2022

(30) Foreign Application Priority Data

Oct. 26, 2018   (CN) .......................... 201811261901.0
Oct. 26, 2018   (CN) .......................... 201821749550.3

(51) Int. Cl.
*B60K 1/00*     (2006.01)
*B60K 1/04*     (2019.01)
*B60L 50/60*    (2019.01)

(52) U.S. Cl.
CPC ............... *B60K 1/04* (2013.01); *B60L 50/66* (2019.02)

(58) Field of Classification Search
CPC .................................. B60K 1/04; B60K 50/66
(Continued)

(56) References Cited

U.S. PATENT DOCUMENTS 4,216,839 A *  8/1980  Gould ..................... B60L 50/66
                                                    267/221
4,450,400 A *  5/1984  Gwyn ..................... B60L 53/80
                                                    414/373
(Continued)

FOREIGN PATENT DOCUMENTS

CN       106476593       3/2017
CN       108082142       5/2018
(Continued)

*Primary Examiner* — Hau V Phan
(74) *Attorney, Agent, or Firm* — Jiwen Chen; Joywin IP Law PLLC

(57) ABSTRACT

An electric car provided with a battery compartment, said electric car comprising a car body (17), a chassis (19), a power drive system, a cab (16) and a control system, the power drive system comprising a battery compartment (8), the battery compartment (8) being fixed at a lower portion of the chassis (19), the battery compartment (8) being a rectangular cavity body wherein one end is a battery inlet/outlet (8.1) and the inner side of the other end is provided with a battery connection socket (14), the rectangular cavity body being internally provided with a battery automatic push-out/guide-in apparatus, the battery inlet/outlet (8.1) of the battery compartment (8) facing towards the front, the rear or the side of the electric car, the control system controlling the battery automatic push-out/guide-in apparatus inside the battery compartment (8) to move. The battery compartment can automatically push out a battery therein, and can also automatically guide in a battery, to facilitate rapid swapping with a battery of a charging device, and increase battery loading/unloading efficiency.

12 Claims, 4 Drawing Sheets

(58) Field of Classification Search
USPC .......................................................... 180/68.5
See application file for complete search history.

(56) References Cited

U.S. PATENT DOCUMENTS

| | | | | |
|---|---|---|---|---|
| 5,360,307 | A * | 11/1994 | Schemm | B62B 3/10 180/68.5 |
| 5,373,910 | A * | 12/1994 | Nixon | B60L 50/66 180/68.5 |
| 5,711,648 | A * | 1/1998 | Hammerslag | B60L 50/66 180/68.5 |
| 5,760,569 | A * | 6/1998 | Chase, Jr. | H01M 50/204 414/281 |
| 7,201,384 | B2 * | 4/2007 | Chaney | B60L 53/80 280/783 |
| 8,006,793 | B2 * | 8/2011 | Heichal | B60L 50/66 180/68.5 |
| 8,013,571 | B2 * | 9/2011 | Agassi | H01M 50/242 414/512 |
| 8,973,254 | B2 * | 3/2015 | Droste | H01M 10/42 29/730 |
| 9,688,252 | B2 * | 6/2017 | Gaffoglio | B60L 53/80 |
| 11,590,858 | B2 * | 2/2023 | Liao | B60L 53/305 |
| 2009/0198372 | A1 * | 8/2009 | Hammerslag | G07F 15/005 700/226 |
| 2013/0104361 | A1 * | 5/2013 | Corfitsen | B60L 53/80 29/402.08 |
| 2013/0175829 | A1 * | 7/2013 | Kim | B60L 50/64 296/204 |
| 2016/0001748 | A1 * | 1/2016 | Moskowitz | B60L 58/26 701/22 |
| 2017/0297541 | A1 | 10/2017 | Droste | |
| 2018/0006283 | A1 * | 1/2018 | Hill | B62D 29/00 |
| 2018/0109328 | A1 * | 4/2018 | Eberhard | G02B 6/4206 |
| 2018/0118044 | A1 * | 5/2018 | Ahrens | B60K 1/04 |

FOREIGN PATENT DOCUMENTS

| | | |
|---|---|---|
| CN | 108556608 | 9/2018 |
| CN | 108674391 | 10/2018 |

* cited by examiner

ELECTRIC CAR PROVIDED WITH BATTERY COMPARTMENT

This is a U.S. national stage application of PCT Application No. PCT/CN2019/098225 under 35 U.S.C. 371, filed Jul. 29, 2019 in Chinese, claiming priority to Chinese Patent Applications No. 201811261901.0 and No. 201821749550.3, both filed Oct. 26, 2018, all of which are hereby incorporated by reference.

TECHNICAL FIELD

The present invention belongs to the technical field of electric vehicle manufacturing, specifically relates to an electric car provided with a battery compartment.

BACKGROUND

The increasing depletion of petroleum resources coupled with the promotion of environment awareness enable new energy vehicles to be a popular choice. Electric vehicles use electric motors instead of fuel engine, which are powered by batteries and driven by motors without gearboxes, having advantages of energy saving, environmental friendly, easy operation and maintenance, reliable, and low in noise. As an indispensable and important part of electric vehicles, batteries provide power energy for electric vehicles. Charging speed is the most critical technical problem of electric vehicles, and almost all of the batteries in the prior art could not sustain long distance driving or require frequent charging midway. The undesirable charging speed restricts the development of electric vehicles.

Two typical solutions are mainly used for the charging of the batteries of the electric vehicles: one is charging pile, and the other is charging station.

The disadvantage of charging pile is the charging speed is slow and the efficiency is far from satisfactory. With respect to the charging station, electric vehicles needs to drive into and be replaced with batteries fully charged and those replaced batteries are transported to where the charging devices are and refueled; throughout the course manual assistance is required, which is consuming, low in automatic control level and slow in power replacement speed.

The battery of an electric vehicle is typically installed inside the vehicle body. It is difficult to replace the battery, and disassemble and assemble process are cumbersome and take a lot of or too much time. Typical electric vehicles have an integrated battery chassis without a battery compartment provided with automatic battery guiding device. The integrated battery chassis is bulky and the replacement of the integrated battery chassis requires special designed equipment and large venues.

Hence at present how to design and develop an electric vehicle with a battery compartment capable of automatically pushing out the battery within or guiding the battery in for insertion, which is convenient for the rapid replacement of the battery to a fully charged one in a charging device, is a technical problem to be solved in this field.

SUMMARY OF THE INVENTION

An electric vehicle provided with a battery compartment comprising a vehicle body, a chassis, and electric drive system, a cab and a control system, characterized in that the electric drive system includes a battery compartment and the battery compartment is fixed below the chassis; the battery compartment has a rectangular cavity with a battery inlet at one end and a battery connection socket at the other end; an automatic battery in-out guiding device is provided inside the rectangular cavity of the battery compartment; the battery inlet face front, rear or lateral along a driving direction of the electric vehicle and the automatic battery in-out guiding device in the battery compartment is controlled by the control system.

As an improvement to the above technical solution: the automatic battery in-out guiding device includes rollers, a motor, a motor controller and a synchronous drive belt which are provided at a bottom surface of the rectangular cavity of the battery compartment; the control system controls the motor to drive the rollers rotate forward or reverse through the motor controller to push out a battery or move a battery into the battery compartment.

As an improvement to the above technical solution: a network module is provided in the cab or the vehicle body and the network module is connected to the control system; an electronic tag is provided on an outer surface of the vehicle body or outside the cab.

As an improvement to the above technical solution: a top of the battery compartment is a removable top cover; one or more batteries is placed in the rectangular cavity; the battery includes a casing, a battery core and circuits which are provided in the casing; one end of the casing is provided with a connector plug and the other end of the casing is provided with a connector socket, the connector plug of the battery is connected to the connector socket through the circuits in the casing; the bottom surface of the rectangular cavity of the battery compartment is provided with a plurality of battery positioning devices which respectively corresponds to each battery.

As an improvement to the above technical solution: the casing of the battery is a rectangular parallelepiped, and the casing or the battery core is provided with the electronic tag and the network module; rotating wheels are provided on lateral surfaces or a top surface of the casing.

As an improvement to the above technical solution: a battery located at an innermost end of the rectangular cavity of the battery compartment is connected to the battery connection socket through the connector plug at one end thereof and the other batteries are connected in series or in parallel through the connector plug and the connector socket thereon.

The advantages and positive effects of the present invention over the prior art are:

1. The automatic battery in-out guiding device in the battery compartment of the electric vehicle of the present invention can automatically push out the battery therein, and can also automatically guide the battery in to realize an automatic connection of the battery, which is convenient for quick replacement with a fully charged battery in the charging device.
2. The casing of batteries in the battery compartment of the electric vehicle of the present invention has a rectangular parallelepiped shape, and the rotating wheels provided on the side or/top surface of the casing facilitate the in-out process of the battery in the battery compartment, and reduces wear on the battery surface.
3. The electric vehicle of the present invention is provided with a network module on the cab or car body, the network module is connected to the control system, and an electronic tag is provided on the side of the car body or the cab. It is easy to realize identification, sharing and connection to the network; and it is also possible to realize short-range wireless connection instead of the network.

4 The casing of the battery of the present invention has a rectangular parallelepiped shape, and an electronic tag and a network module are arranged on the casing or the battery cell to facilitate the identification, sharing, and connection to the network.

DETAILED DESCRIPTION OF THE INVENTION

Figure 1:
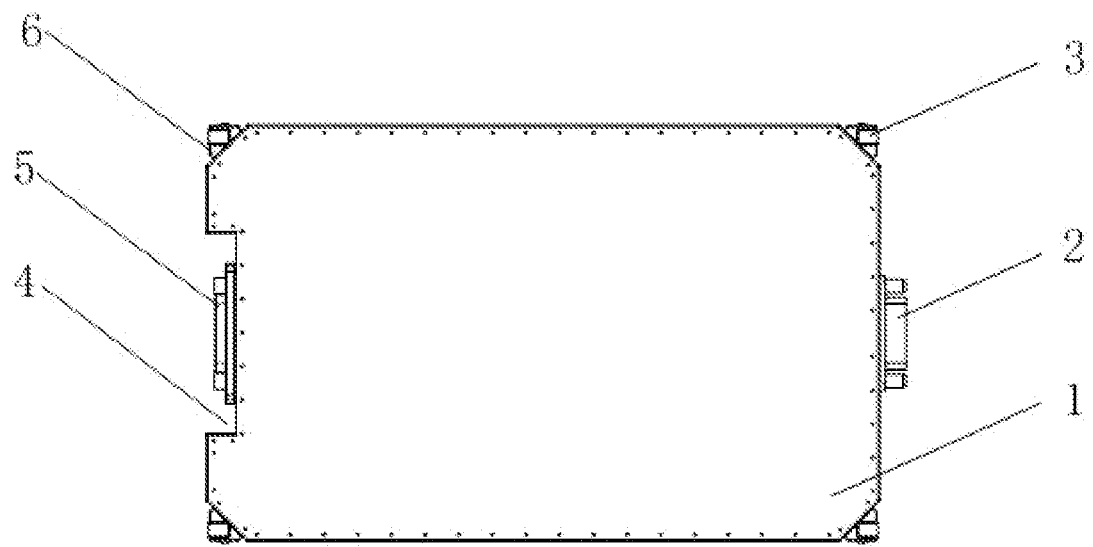
FIG. 1 is a plan view of a battery used in a battery compartment of an electric vehicle according to one aspect of the present invention.

The present invention will be described in further detail below according to the drawings.

Referring to FIG. 4 to FIG. 8, an electric vehicle provided with a battery compartment is provided, which includes a vehicle body 17, a chassis 19, an electric drive system, a cab 16 and a control system; wherein the electric drive system includes a battery compartment 8, and the battery compartment 8 is fixed below the chassis 19, and the chassis 19 is provided with wheels 18 thereon. The battery compartment 8 has a rectangular cavity with a battery inlet 8.1 at one end and a battery connection socket 14 at the other end. An automatic battery in-out guiding device is provided inside the rectangular cavity of the battery compartment 8. The battery inlet 8.1 may face front, or rear, or lateral along a driving direction of the electric vehicle and the automatic battery in-out guiding device in the battery compartment 8 is controlled by the control system.

A network module is provided in the cab 16 or on the vehicle body 17, which is connected to the control system. An electronic tag is provided on an outer surface of the vehicle body 17 or outside the cab 16 and the control system is preferably installed in the cab 16 to facilitate operation and control.

Referring to FIG. 1 to FIG. 6, the automatic battery in-out guiding device includes rollers 13, a motor, a motor controller 11 and a synchronous drive belt which are provided at a bottom surface of the rectangular cavity of the battery compartment 8. The control system controls the motor to drive the rollers 13 to rotate forward or reverse through the motor controller 11 so as to push a battery out or move a battery into the battery compartment 8. The motor 11 drive the rollers 13 to rotate forward or reverse through a roller transmission mechanism so that the battery is pushed out or moved into the battery compartment 8. In order to simply assembly, a top of the battery compartment 8 is a removable top cover 9.

Figure 6:
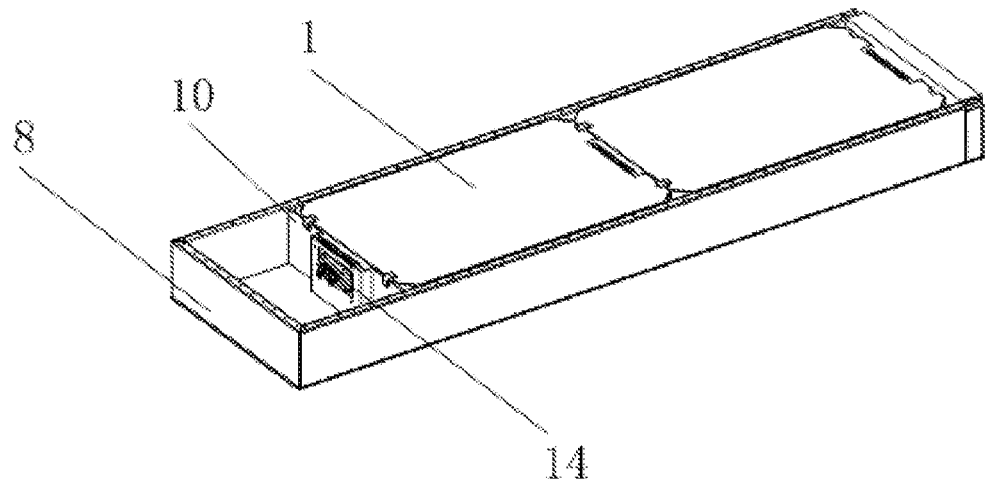
FIG. 6 is a perspective view of the battery compartment with the battery of the electric vehicle according to one aspect of the present invention.
Figure 7:
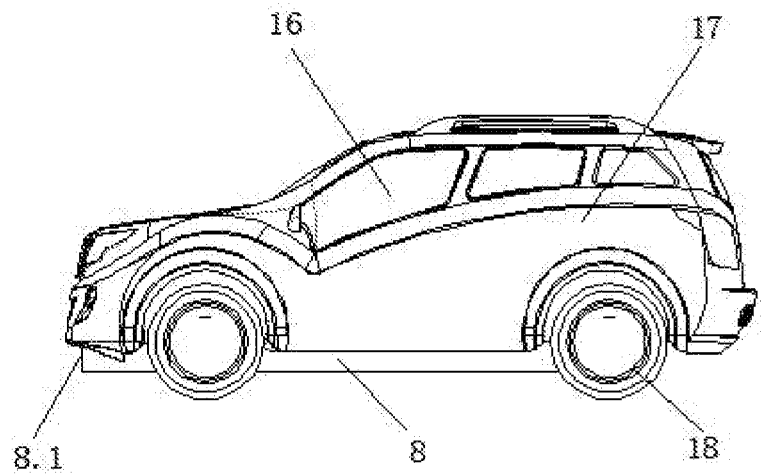
FIG. 7 is a side view of an electric vehicle provided with a battery compartment according to another aspect of the present invention.
Figure 8:
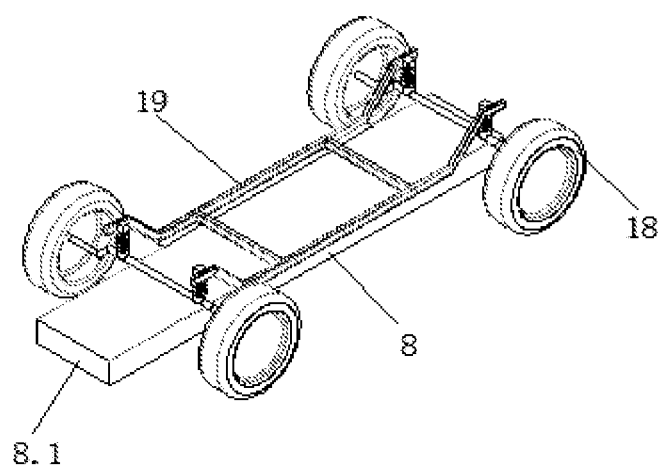
FIG. 8 is a schematic diagram of a connection structure between a chassis and the battery compartment disposed in the electric vehicle provided with a battery compartment according to another aspect of the present invention.

Further, one or more batteries (preferably two batteries are provided in this embodiment, as shown in FIG. 6) is placed in the rectangular cavity of the battery compartment 8. The battery includes a casing 1, a battery core and circuits which are provided in the casing 1. One end of the casing 1 is provided with a connector plug 2 and the other end of the casing 1 is provided with a connector socket 5, the connector plug 2 of the battery is connected to the connector socket 5 through the circuits in the casing 1. The bottom surface of the rectangular cavity of the battery compartment 8 is provided with a plurality of battery positioning devices 12 which respectively corresponds to each battery.

To be specific, the battery positioning device 12 includes a fixing plate 15 and a wedge-shaped block 12 mounting on the fixing plate 15. The fixing plate 15 is fixed on the bottom surface of the rectangular cavity of the battery compartment 8. The height of the fixing plate 15 is lower than the height of the rollers 13. A vertical movement of the wedge-shaped block 12 is controlled by the control system through electromagnetic components. When the battery is moved out from the battery compartment 8, the wedged-shaped block 12 is controlled by the control system through the electromagnet components to lower down; when the battery is moved in to a preset position in the battery compartment 8, the wedged-shaped block 12 is controlled by the control system through the electromagnet components to rise until an upper end of the wedged-shaped block 12 is higher than the rollers 13, a vertical end surface of the wedged-shaped block 12 abuts against one side of the battery to fix the battery in a reliable way.

Figure 2:
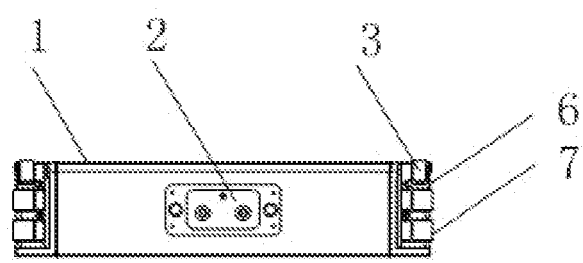
FIG. 2 is a side view of the battery used in the battery compartment of the electric vehicle according to one aspect of the present invention.
Figure 3:
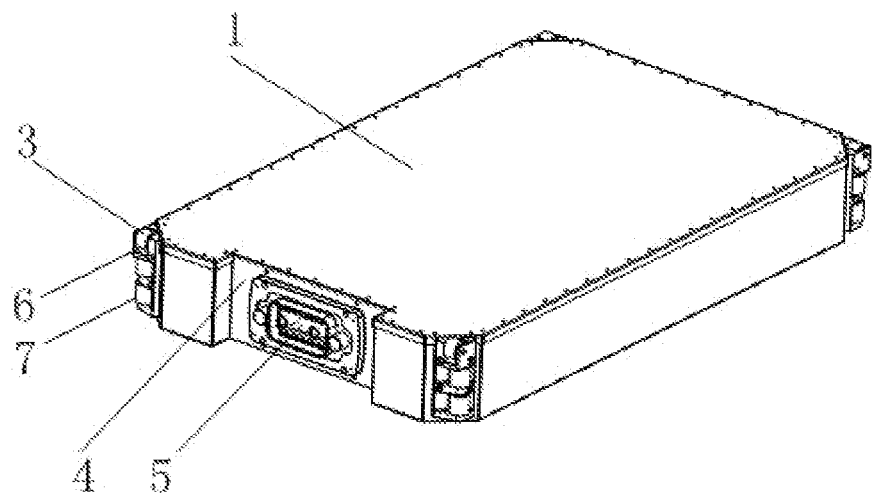
FIG. 3 is a perspective view of the battery used in the battery compartment of the electric vehicle according to one aspect of the present invention.
Figure 4:
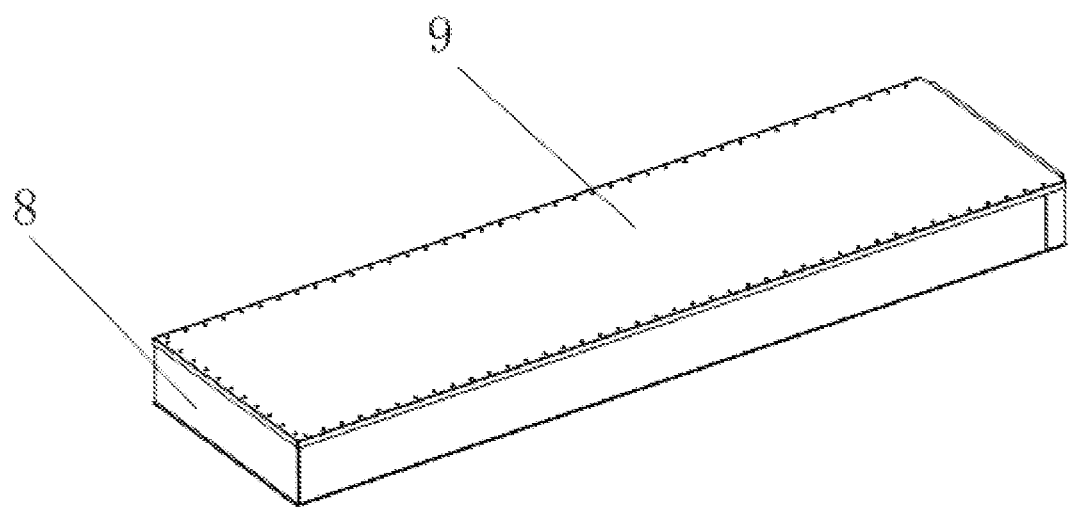
FIG. 4 is a perspective view of the battery compartment of the electric vehicle being covered by a cover according to one aspect of the present invention.
Figure 5:
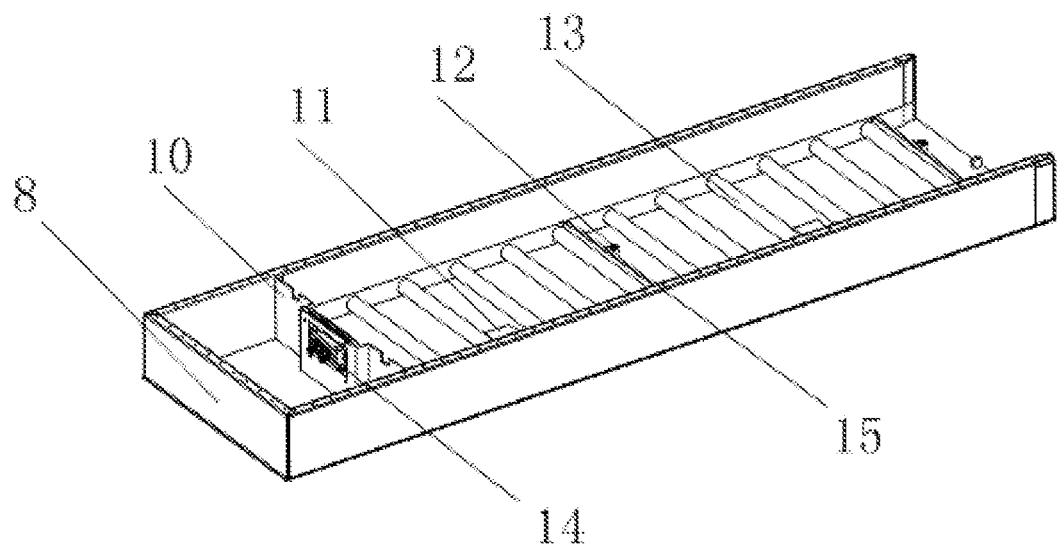
FIG. 5 is a perspective view of the battery compartment of the electric vehicle without a cover according to one aspect of the present invention.

The casing 1 of the battery is a rectangular parallelepiped and the casing 1 or the battery core is provided with the electronic tag and the network module. In order to facilitate the in-out process of the battery from the battery compartment 8, the casing 1 is preferably designed in a shape of rectangular parallelepiped and rotating wheels are provided on lateral surfaces or a top surface of the casing 1. To be specific, as shown in FIG. 1 to FIG. 3, the rotating wheels comprises top rotating wheels 3 and lateral rotating wheels 7. The corners of the casing 1 are chamfered and a rotating wheel frame 6 is provided at each chamfered corner. One top rotating wheel 3 which is rotated along a vertical shaft or one lateral rotating wheel which is rotated along a horizontal shaft is respectively arranged along one rotating wheel frame 6. When a battery moves within the battery compartment 8, the top rotating wheels contact an inner surface of the top wall of the battery compartment 8 and the lateral rotating wheels contact an inner surface of the side wall of the battery compartment 8 so as to reduce wear on battery surface as the battery moving within the battery compartment 8. The rotating wheel frame 6 and the top rotating wheel 3 thereon are preferably integrated, and the rotating wheel frame 6 and the lateral rotating wheel 7 are also preferably integrated and these arrangements are convenient for assembly, disassembly, maintenance and replacement.

A battery located at an innermost end of the rectangular cavity of the battery compartment 8 is connected to the battery connection socket 14 through the connector plug 2 at one end thereof and the other batteries are connected in series or in parallel through the connector plug 2 and the connector socket 5 thereon.

The above description is not a limitation of the present invention, and the present invention is not limited to the above examples. Those of ordinary skill in the art who make changes, modifications, additions, or replacements within the essential scope of the present invention also belong to the scope of protection of the invention.

The invention claimed is:

1. An electric vehicle provided with a battery compartment comprising a vehicle body, a chassis, and electric drive system, a cab and a control system, wherein the electric drive system includes the battery compartment, and the battery compartment is fixed below the chassis; the battery compartment has a rectangular cavity with a battery inlet at one end and a battery connection socket at the other end; an automatic battery in-out guiding device is provided inside the rectangular cavity of the battery compartment; the battery inlet faces front or rear along a driving direction of the electric vehicle, or the battery inlet faces laterally and is perpendicular to the driving direction of the electric vehicle, and the automatic battery in-out guiding device in the battery compartment is controlled by the control system.

2. An electric vehicle provided with a battery compartment according to claim 1, wherein the automatic battery in-out guiding device includes rollers, a motor, a motor controller and a synchronous drive belt which are provided at a bottom surface of the rectangular cavity of the battery compartment; the control system controls the motor to drive the rollers rotate forward or reverse through the motor controller to push out a battery or move a battery into the battery compartment.

3. An electric vehicle provided with a battery compartment according to claim 2, wherein a network module is provided in the cab or the vehicle body and the network module is connected to the control system; an electronic tag is provided on an outer surface of the vehicle body or outside the cab.

4. An electric vehicle provided with a battery compartment according to claim 2, wherein a top of the battery compartment is a removable top cover; one or more batteries is placed in the rectangular cavity; the battery includes a casing, a battery core and circuits which are provided in the casing; one end of the casing is provided with a connector plug and the other end of the casing is provided with a connector socket, the connector plug of the battery is connected to the connector socket through the circuits in the casing; the bottom surface of the rectangular cavity of the battery compartment is provided with a plurality of battery positioning devices which respectively corresponds to each battery.

5. An electric vehicle provided with a battery compartment according to claim 1, wherein a network module is provided in the cab or the vehicle body and the network module is connected to the control system; an electronic tag is provided on an outer surface of the vehicle body or outside the cab.

6. An electric vehicle provided with a battery compartment according to claim 5, wherein a top of the battery compartment is a removable top cover; one or more batteries is placed in the rectangular cavity; the battery includes a casing, a battery core and circuits which are provided in the casing; one end of the casing is provided with a connector plug and the other end of the casing is provided with a connector socket, the connector plug of the battery is connected to the connector socket through the circuits in the casing; the bottom surface of the rectangular cavity of the battery compartment is provided with a plurality of battery positioning devices which respectively corresponds to each battery.

7. An electric vehicle provided with a battery compartment according to claim 6, wherein the casing of the battery is a rectangular parallelepiped, and the casing or the battery core is provided with the electronic tag and the network module; rotating wheels are provided on lateral surfaces or a top surface of the casing.

8. An electric vehicle provided with a battery compartment according to claim 7, wherein a battery located at an innermost end of the rectangular cavity of the battery compartment is connected to the battery connection socket through the connector plug at one end thereof and the other batteries are connected in series or in parallel through the connector plug and the connector socket thereon.

9. An electric vehicle provided with a battery compartment according to claim 6, wherein a battery located at an innermost end of the rectangular cavity of the battery compartment is connected to the battery connection socket through the connector plug at one end thereof and the other batteries are connected in series or in parallel through the connector plug and the connector socket thereon.

10. An electric vehicle provided with a battery compartment according to claim 1, wherein a top of the battery compartment is a removable top cover; one or more batteries is placed in the rectangular cavity; the battery includes a casing, a battery core and circuits which are provided in the casing; one end of the casing is provided with a connector plug and the other end of the casing is provided with a connector socket, the connector plug of the battery is connected to the connector socket through the circuits in the casing; the bottom surface of the rectangular cavity of the battery compartment is provided with a plurality of battery positioning devices which respectively corresponds to each battery.

11. An electric vehicle provided with a battery compartment according to claim 10, wherein the casing of the battery is a rectangular parallelepiped, and the casing or the battery core is provided with the electronic tag and the network module; rotating wheels are provided on lateral surfaces or a top surface of the casing.

12. An electric vehicle provided with a battery compartment according to claim 10, wherein a battery located at an innermost end of the rectangular cavity of the battery compartment is connected to the battery connection socket through the connector plug at one end thereof and the other batteries are connected in series or in parallel through the connector plug and the connector socket thereon.

* * * * *